R. CARLSTEDT.
METHOD OF AND APPARATUS FOR AUTOMATIC CONTROL.
APPLICATION FILED MAR. 14, 1918.
1,317,956.                                    Patented Oct. 7, 1919.
2 SHEETS—SHEET 2.
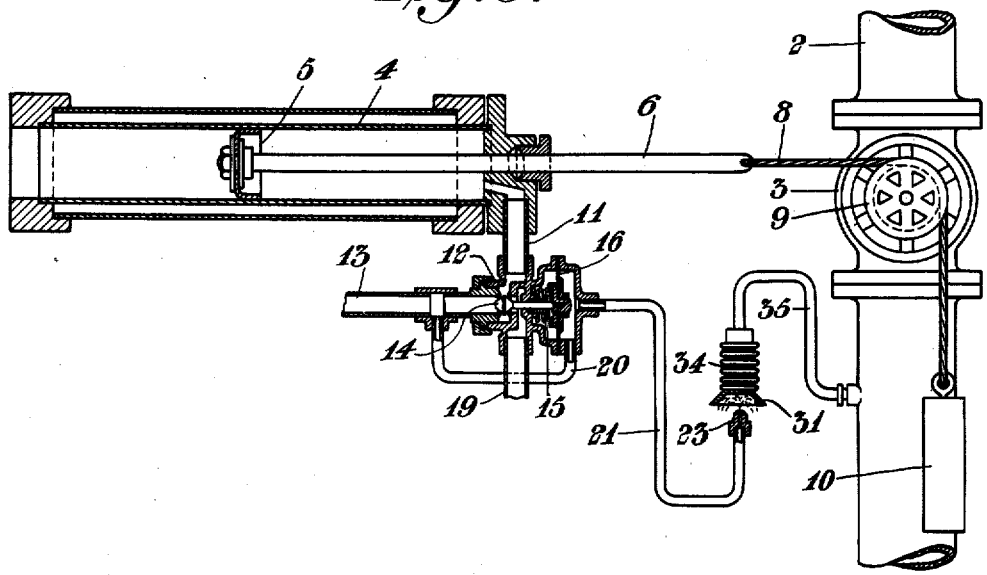
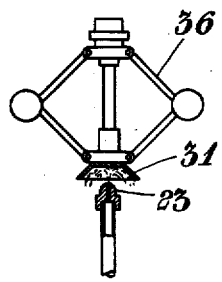
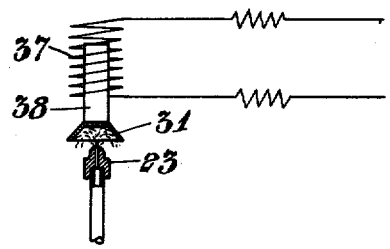
Inventor:
Ragner Carlstedt.
By George Bayard Jones,

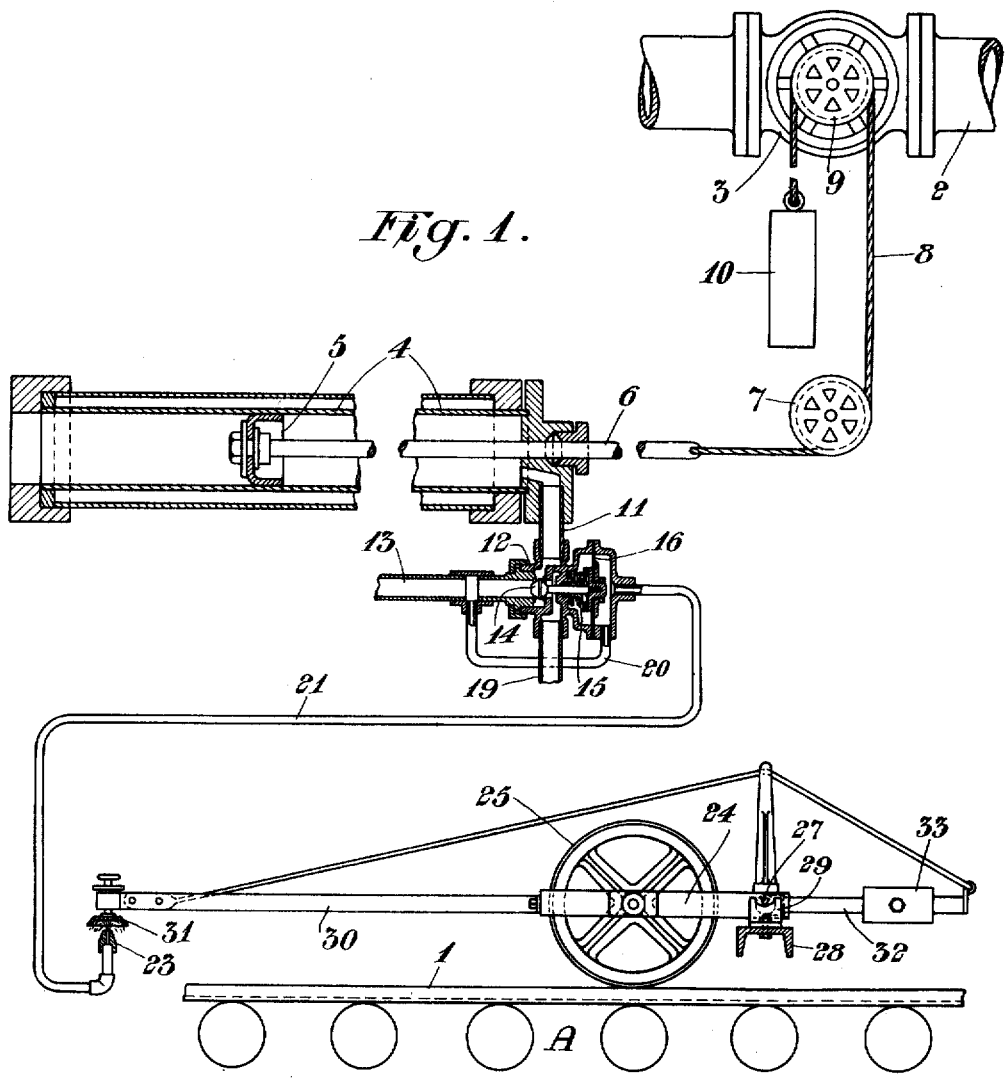
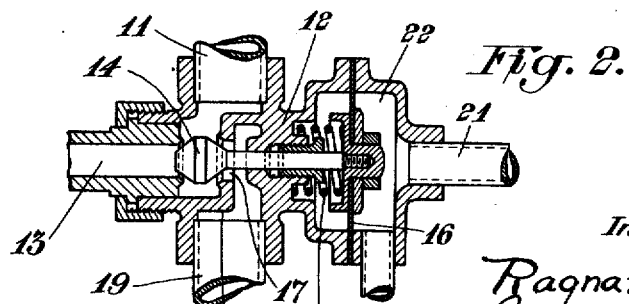

UNITED STATES PATENT OFFICE.

RAGNAR CARLSTEDT, OF STOCKHOLM, SWEDEN, ASSIGNOR TO AKTIEBOLAGET ARCA REGULATORER, OF STOCKHOLM, SWEDEN, A COMPANY OF SWEDEN.

METHOD OF AND APPARATUS FOR AUTOMATIC CONTROL.

1,317,956.  Specification of Letters Patent.  Patented Oct. 7, 1919.

Application filed March 14, 1918. Serial No. 222,381.

*To all whom it may concern:*

Be it known that I, RAGNAR CARLSTEDT, a subject of the King of Sweden, residing at Stockholm, in the Kingdom of Sweden, have invented new and useful Improvements in Methods of and Apparatus for Automatic Control, of which the following is a specification.

The present invention relates to a means for automatic control of the kind having an element connected with a main regulator or controller for that which is to be regulated, which element is under the influence of a non-compressible liquid, such as water, oil, or the like, permanently flowing in a conduit, the flow of said liquid being checked more or less by the influence of that which is to be regulated by means of the main regulator or controller, in order in this manner to effect variations in the influence of the liquid on said element and thus to effect adjustment of the main regulator or controller connected with said element. Heretofore the practical use of such regulating devices has been very much limited, due to the difficulty of obtaining a sufficient sensitiveness of the member which is under the influence of that which is to be regulated, and by means of which member the flow of the liquid is to be checked more or less. In order to make the said member sensitive for but exceedingly small variations or fluctuations in that which is to be regulated, it is obviously necessary that said member be practically frictionless.

This condition is fulfilled in a simple and practical manner by the present invention, which is broadly characterized by this, that the said liquid permanently flows out through a discharge nozzle on the conduit, before which nozzle a movable member such as a shield, cup or the like is arranged, which member is caused to move toward or away from the orifice of said nozzle by that which is to be regulated, thus checking the outflow of the liquid more or less. The said member, shield, cup or the like may be connected with the device or the like to be regulated, or otherwise actuated by whatever is to be controlled.

For regulating for instance the pulp-sheet supplied to a paper machine the cup may be attached to an arm supported by a roll movable in vertical direction and rolling on the pulp-sheet. When the apparatus is used for regulating steam or gas flowing through a pipe or a conduit the cup is attached to a pressure-box or a piston actuated by the pressure in the conduit. For governing the speeds of machinery the cup may be connected, for instance, with a centrifugal governor, and for regulating an electric current with the armature of a magnet or a solenoid, and so forth.

In the accompanying drawings an embodiment of an apparatus according to the present invention is illustrated as applied for various purposes. Figure 1 shows the invention as applied for automatic regulation of the pulp-sheet supplied to a paper machine. Fig. 2 shows to a larger scale the valve device combined with a diaphragm by means of which device the variations in the flow of the liquid are transmitted from the one conduit to the other. Fig. 3 illustrates the invention as applied for automatic control of the flow in a steam conduit. Fig. 4 shows a detail of a device in which the discharge of the liquid is made dependent on a centrifugal governor, and Fig. 5 illustrates a detail of a device in which the discharge of the liquid is regulated electromagnetically.

Referring to Fig. 1, A denotes a portion of the wire-part of a paper machine with the pulp-sheet 1 on the wire. 2 denotes the supply pipe for the pulp, the supply of the pulp to the wire-part being regulated by means of a valve 3 in the supply pipe. The position of the valve 3 is dependent on the position of a piston 5 movable in a cylinder 4, the rod 6 of the piston being connected with a rope 8 or the like running over a pulley 7 and passing over a pulley 9 connected with the valve body of the valve 3. On its right hand side the piston 5 is actuated by the pressure of a liquid in the cylinder 4, which pressure tends to move the piston to the left but which is balanced by suitable means acting on the rope 8, for instance a counterweight 10.

According to the invention the pressure of the liquid acting in the cylinder is effected in the following manner:

One end of a pipe 11 opens into the right hand end of the cylinder 4, the other end of said pipe being connected with a valve device. This valve device consists of a casing 12 in the interior of which opens a pipe 13 through which water or other liquid under pressure may be supplied to the valve device. The end of the pipe 13 located within the valve device is situated opposite, and its opening is controlled by means of a valve 14 which is rigidly connected with a diaphragm 16 secured in the casing 12 and actuated by a spring 15. The pipe 13 communicates with the pipe 11 leading to the cylinder 4, and with a waste pipe 19 through an opening 17 in a partition 18 in the casing 12 which opening 17 is also controlled by the valve 14. The supply pipe 13 is connected with a pipe 20 leading past the valve casing and communicating with a chamber 22 partitioned in the valve casing 12 by the diaphragm 16. The pipe 21 communicates at one end with the chamber 22 and at its other end it is provided with a discharge nozzle 23.

Above the wire-part A there is provided a balancing device actuated by the pulp-sheet on the wire, the construction of which balancing device will now be described. A rectangular frame 24 supports a rotatable roll 25 provided with a grooved, corrugated, or toothed shell, said roll bearing on the pulp-sheet 1. The frame 24 is capable of turning on edges 27 resting in pans 29 secured to a cross beam 28 extending over the machine. An arm 30 is secured to the frame 24, the outer end of which arm supports an inverted cup or shield 31 located closely above the exhaust nozzle 23. On the side of the turning axis of the frame 24 opposite the arm 30 and the roll 25 an arm 32 is secured to the frame, said arm supporting a counter-weight 33 adjustable in the longitudinal direction of the arm.

The apparatus described operates in the following manner:

Through the supply pipe 13 pressure liquid continuously flows into the valve casing 12 and flows away through the waste pipe 19, being simultaneously admitted through the pipe 11 into the cylinder 4 where it causes a pressure which tends to move the piston 5 to the left. This pressure is balanced by the counter-weight 10 so that the valve 3 is held in a certain position and admits such a quantity of pulp to the wire-part that the pulp forms a sheet of predetermined normal thickness. Pressure liquid simultaneously flows through the pipe 20 from the pipe 13 into the chamber 22, and into the pipe 21, from which it is discharged through the nozzle 23 striking against the cup 31.

As long as the pulp-sheet on the wire-part retains its normal thickness the movable members described are balanced and retain their respective positions. If the thickness of the pulp-sheet increases, the roll 25 is raised and the arm 30 and the cup 31 are raised on account of which the checking action exercised by the cup 31 in the flow of liquid through the nozzle 23, and simultaneously the pressure against the diaphragm 16 of the liquid in the chamber 22 and in the pipe 21, is decreased. The diaphragm then moves under the action of the spring 15 a little to the right, owing to which the valve 14 is drawn away from the opening of the pipe 13 in the valve casing 12 so that the inlet opening for the pressure fluid is increased, and at the same time the outlet through the opening 17 is throttled by the valve 14 being moved toward this opening. The pressure of the liquid acting upon the piston 5 in the cylinder 4 is therefore increased, owing to which the piston moves a little to the left, thereby turning the valve 3 in such manner that the supply of pulp to the wire-part is decreased.

When the thickness of the pulp-sheet on the wire-part decreases the cup 31 is lowered toward the nozzle 23, on account of which an increased checking of the discharge of fluid through the nozzle is effected. The pressure in the chamber 22 is then increased, the diaphragm 16 moves to the left and the inlet opening for the liquid from the pipe 13 into the valve casing 12 is throttled by the valve 14 and simultaneously the discharge through the opening 17 becomes facilitated, the pressure on the piston 5 in the cylinder 4 thus decreasing. As a result the weight 10 now turns the valve 3 in such manner that the supply of pulp to the wire-part is increased.

From the above description it is thus clear that the variations in the flow of the liquid in the pipe 21 and in the pressure of the liquid in the pipe caused by the movement of the cup 31 are transmitted by means of the diaphragm 16 and the valve 14, which together form a relay device, to the liquid in the conduit 13, 11, 19, and cause variations in the flow of this liquid and thus also in the pressure exerted by this liquid on the piston 5. Instead of both the pipe 21 and the pipes 11 and 19 communicating with a common supply pipe 13 for pressure liquid, the pipe 21 may of course communicate with one supply pipe and the pipes 11 and 19 with another supply pipe.

In the embodiment illustrated in Fig. 3 the fluid the supply of which is to be regulated, is supposed to be steam or gas which is supplied through the pipe 2 and the quantity of which is regulated by means of the valve 3. The control apparatus actuating the valve 3 is quite analogous to the one described above in connection with Figs. 1 and 2, corresponding parts having similar reference numerals. In Fig. 3 the cup or shield 31 serving for checking the discharge of fluid through the nozzle 23, is attached to a cylinder or pressure box 34 provided with a corrugated shell and communicating by means of a pipe 35 with the steam pipe 2. If the quantity and pressure of the steam in the pipe 2 increases over a normal value, the cylinder 34 is extended and moves the cup 31 toward the nozzle. If the quantity of steam or the pressure in the pipe 2 decreases, the cylinder contracts owing to the spring action of the corrugated shell, thus moving the cup 31 away from the nozzle 23 with the result described above.

As shown in Fig. 4 the movement of the shield 31 toward and away from the nozzle 23 may also be effected by means of a centrifugal governor 36, and it is thus obvious that the invention may easily be applied for controlling the speed of an engine or a machine. According to Fig. 5 the shield 31 arranged over the discharge nozzle 23 is secured to an iron core or armature 38 of a solenoid 37, it being evident that in this manner electric currents and electrical machines may be easily controlled by means of the invention.

I claim:

1. A method of automatic control, consisting in making the flow of a fluid dependent on and regulated by that which is to be controlled, controlling the flow of a second fluid by means of the firstnamed fluid, and placing an element for effecting the control under the influence of the second fluid, substantially as and for the purpose set forth.

2. In an apparatus for automatic control, the combination of a conduit for a fluid, a device in said conduit adapted to regulate the flow of the fluid in the same and actuated by that which is to be controlled, an element communicating with said conduit and actuated by the fluid in the same, a second conduit for a fluid, a device in said second conduit for controlling the fluid in the same and operatively connected to the said element, and an element for effecting the control communicating with said second conduit and actuated by the fluid in the same, substantially as and for the purpose set forth.

3. In an apparatus for automatic control, the combination of a conduit for a fluid, a device in said conduit adapted to regulate the flow of the fluid in the same and actuated by that which is to be controlled, a diaphragm in said conduit actuated by the fluid in the same, a second conduit for a fluid, a valve in said second conduit for controlling the fluid in the same and operatively connected to the said diaphragm, and an element for effecting the control communicating with said second conduit and actuated by the fluid in the same, substantially as and for the purpose set forth.

4. In an apparatus for automatic control, the combination of a conduit for a fluid, a device in said conduit adapted to regulate the flow of the fluid in the same and actuated by that which is to be controlled, a diaphragm in said conduit actuated by the fluid in the same, a second conduit for a fluid, a supply opening in the second conduit, a waste opening in the second conduit, a valve in the said second conduit controlling the said openings and operatively connected to the said diaphragm, and an element for effecting the control communicating with said second conduit between the said openings, substantially as and for the purpose set forth.

5. In an apparatus for automatic control, the combination of a conduit for a fluid, a discharge nozzle on the said conduit, a member movable toward and away from said discharge nozzle and actuated by that which is to be controlled, and an element for effecting the control communicating with the said conduit and actuated by the fluid in the same, substantially as and for the purpose set forth.

6. In an apparatus for automatic control, of the pulp-sheet supplied to a paper machine, the combination of a conduit for a fluid, a discharge nozzle on the said conduit, a member movable toward and away from said discharge nozzle, a swinging arm supporting said member, a roll journaled in and supporting said arm and rolling on the pulp-sheet, a supply pipe for the pulp, a valve in said pipe, and an element adapted to operate the said valve and communicating with the said conduit and actuated by the fluid in the same, substantially as and for the purpose set forth.

7. In a means for automatic control, the combination of a conduit for a permanently flowing liquid, an element communicating with the said conduit and adapted to be actuated by the liquid in the same, a main regulator for that which is to be controlled connected with said element, a discharge nozzle on said conduit for the permanently flowing liquid, and a member adapted to be actuated by that which is to be controlled to move toward and away from said nozzle and by said movement to check the outflow of the liquid more or less.

8. In a means for automatic control, the combination of a conduit for a permanently flowing liquid, an element communicating with the said conduit and adapted to be actuated by the liquid in the same, a main regulator for that which is to be controlled connected with said element, a discharge nozzle on said conduit for the permanently flowing liquid, a member adapted by movement toward and away from said nozzle to check the outflow of the liquid more or less, and means adapted to be actuated by that which is to be controlled and actuating said member so as to move it toward and away from said nozzle.

9. In a means for automatic control, the combination of a conduit for a permanently flowing liquid, an element communicating with the said conduit and adapted to be actuated by the liquid in the same, a second conduit for a liquid, a valve in said second conduit for controlling the liquid in the same and operatively connected to said element, means communicating with said second conduit and actuated by the liquid in the same, a main regulator for that which is to be controlled connected with and actuated by said means, a discharge nozzle on said first-named conduit for the permanently flowing liquid, and a member adapted to be actuated by that which is to be controlled to move toward and away from said nozzle and by said movement to check the outflow of the liquid more or less.

10. In a means for automatic control, the combination of a conduit for a permanently flowing liquid, an element communicating with the said conduit and adapted to be actuated by the liquid in the same, a second conduit for a liquid, a supply opening in said second conduit, a waste opening in said second conduit, a valve in said second conduit controlling said openings and operatively connected to said element, means communicating with said second conduit and actuated by the liquid in the same, a main regulator for that which is to be controlled connected with and actuated by said means, a discharge nozzle on said first-named conduit for the permanently flowing liquid, and a member adapted to be actuated by that which is to be controlled to move toward and away from said nozzle and by said movement to check the outflow of the liquid more or less.

11. In a means for automatic control of the pulp-sheet supplied to a paper machine, the combination of a conduit for a permanently flowing liquid, an element communicating with the said conduit and adapted to be actuated by the liquid in the same, a supply pipe for the pulp, a valve in said pipe adapted to be operated by said element, a swinging arm, a roll journaled in and supporting said arm and rolling on the pulp-sheet, a discharge nozzle on said conduit for the permanently flowing liquid, and a member supported by said swinging arm so as to be movable toward and away from said nozzle and adapted by said movement to check the outflow of the liquid through said nozzle more or less.

12. In a means for automatic control of the pulp-sheet supplied to a paper machine, the combination of a conduit for a permanently flowing liquid, an element communicating with the said conduit and adapted to be actuated by the liquid in the same, a second conduit for a liquid, a valve in said second conduit for controlling the liquid in the same and operatively connected to said element, means communicating with said second conduit and actuated by the liquid in the same, a supply pipe for the pulp, a valve in said pipe adapted to be operated by said means, a swinging arm, a roll journaled in and supporting said arm and rolling on the pulp-sheet, a discharge nozzle on said first-named conduit for the permanently flowing liquid, and a member supported by said swinging arm so as to be movable toward and away from said nozzle and adapted by said movement to check the outflow of the liquid through said nozzle more or less.

RAGNAR CARLSTEDT.